(12) United States Patent
Inoue

(10) Patent No.: US 12,265,093 B2
(45) Date of Patent: Apr. 1, 2025

(54) AUTOMATIC ANALYZER AND NON-TRANSITORY COMPUTER-READABLE RECORDING MEDIUM STORING PROGRAM

(71) Applicant: JEOL Ltd., Tokyo (JP)

(72) Inventor: Yuichi Inoue, Tokyo (JP)

(73) Assignee: JEOL Ltd., Tokyo (JP)

(*) Notice: Subject to any disclaimer, the term of this patent is extended or adjusted under 35 U.S.C. 154(b) by 696 days.

(21) Appl. No.: 15/951,461

(22) Filed: Apr. 12, 2018

(65) Prior Publication Data

US 2019/0317117 A1 Oct. 17, 2019

(51) Int. Cl.
*G01N 35/00* (2006.01)
*G01N 35/02* (2006.01)
(Continued)

(52) U.S. Cl.
CPC .. *G01N 35/00722* (2013.01); *G01N 35/00693* (2013.01); *G01N 35/025* (2013.01);
(Continued)

(58) Field of Classification Search
CPC .......... G01N 35/00722; G01N 35/025; G01N 35/00584; G01N 2035/0443; G01N 35/1002; G01N 35/10; G01N 35/00; G01N 35/0099; G01N 35/02; G01N 2035/0091; G01N 35/00693; G01N 35/0092

See application file for complete search history.

(56) References Cited

U.S. PATENT DOCUMENTS 7,402,730 B1 * 7/2008 Sparks ............... A01K 67/0276
 435/325
7,992,770 B2 * 8/2011 Holley ................. G06Q 10/087
 235/487

(Continued)

FOREIGN PATENT DOCUMENTS

JP 886784 A 4/1996
JP 2007315970 A 6/2007
(Continued)

OTHER PUBLICATIONS

European Search Report dated Oct. 1, 2018 issued in EP No. 18166668.6-1001.
Japanese Office Action drafted in JP2016-222076 on Aug. 3, 2020.

*Primary Examiner* — P. Kathryn Wright
*Assistant Examiner* — Curtis A Thompson
(74) *Attorney, Agent, or Firm* — The Webb Law Firm

(57) ABSTRACT

An automatic analyzer includes a control unit that performs a process when a sample necessary to perform measurement for measurement content selected on an item selection screen is not arranged in a sample-container array unit. The process includes referring to the measurement content selected on the item selection screen and availability information that is information indicating whether each position in the sample-container array unit is available. A position in the sample-container array unit at which a container containing the sample necessary to perform measurement for the selected measurement content is to be arranged is specified in accordance with a specified arrangement rule, and information on the specified position in the sample-container array unit is displayed on a display unit.

5 Claims, 10 Drawing Sheets

(51) Int. Cl.
*G01N 35/04* (2006.01)
*G01N 35/10* (2006.01)

(52) U.S. Cl.
CPC ....... *G01N 35/00* (2013.01); *G01N 35/00584* (2013.01); *G01N 2035/0091* (2013.01); *G01N 35/0099* (2013.01); *G01N 35/02* (2013.01); *G01N 2035/0443* (2013.01); *G01N 35/10* (2013.01); *G01N 35/1002* (2013.01)

(56) References Cited

U.S. PATENT DOCUMENTS

| | | | | |
|---|---|---|---|---|
| 2005/0071110 | A1* | 3/2005 | Davis | G16H 10/40 |
| | | | | 702/123 |
| 2008/0240091 | A1* | 10/2008 | Kesavan | H04L 65/1053 |
| | | | | 370/389 |
| 2011/0269239 | A1* | 11/2011 | Diessel | G01N 35/028 |
| | | | | 436/43 |
| 2012/0128534 | A1* | 5/2012 | Minemura | G01N 35/1002 |
| | | | | 422/67 |
| 2016/0124008 | A1* | 5/2016 | Kraemer | G01N 35/04 |
| | | | | 436/45 |
| 2017/0010292 | A1* | 1/2017 | Shiba | G01N 35/00663 |
| 2017/0082591 | A1* | 3/2017 | Mori | G01N 33/18 |
| 2017/0205435 | A1* | 7/2017 | Hagiwara | G01N 35/00 |
| 2017/0328925 | A1* | 11/2017 | Sano | G01N 35/025 |
| 2018/0180637 | A1* | 6/2018 | Fujita | G01N 1/42 |
| 2021/0227837 | A1* | 7/2021 | De Haan | A23L 3/3517 |

FOREIGN PATENT DOCUMENTS

| | | | | |
|---|---|---|---|---|
| JP | 2012122865 | A | 6/2012 | |
| JP | 2013134140 | A | 7/2013 | |
| JP | 2016090536 | A * | 5/2016 | ............ G01N 35/00 |
| JP | 2016211948 | A * | 12/2016 | ............ G06F 17/30 |
| JP | WO2016084462 | A1 | 8/2017 | |
| JP | 201880957 | A | 5/2018 | |

* cited by examiner

FIG. 1

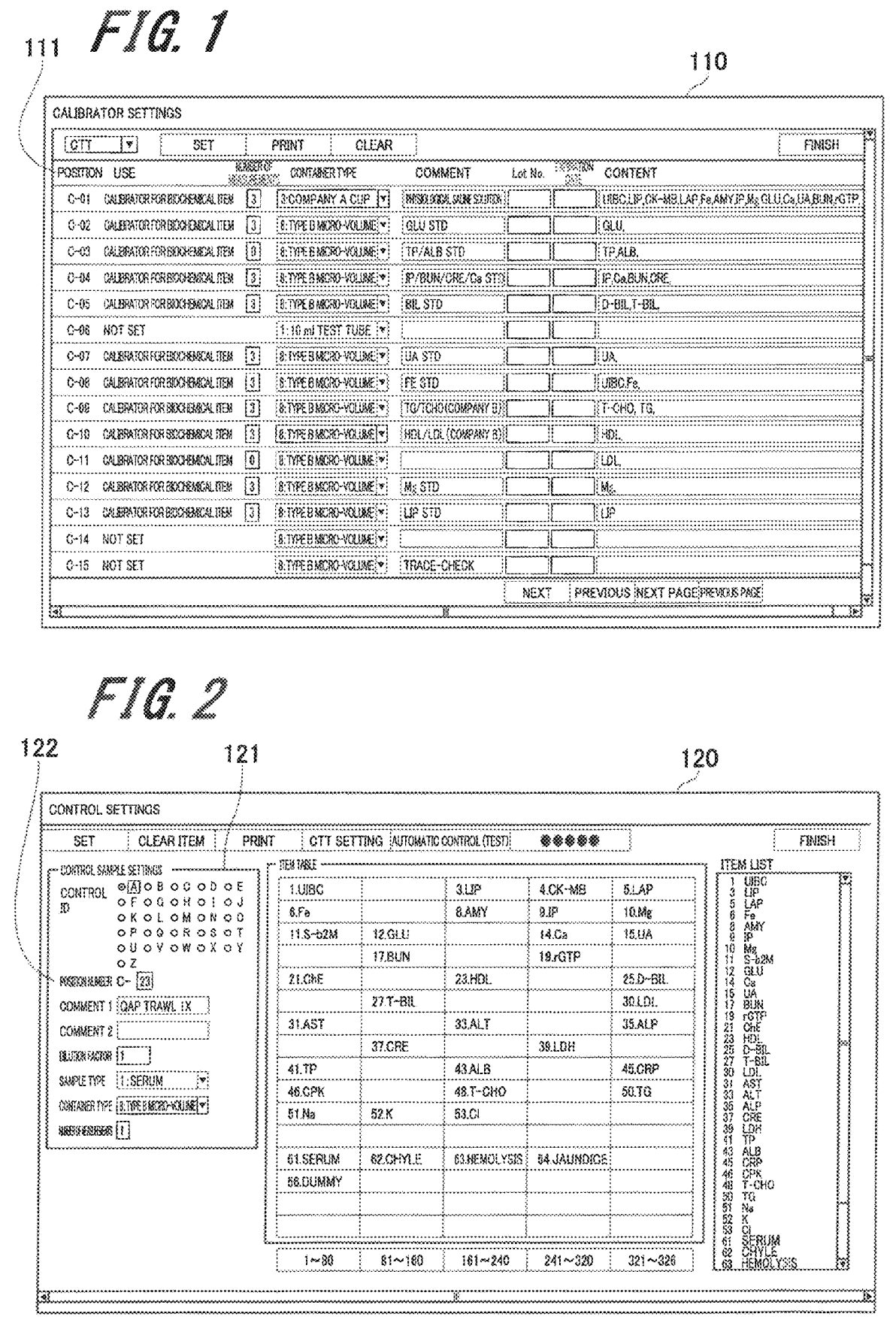

*[Figure 1: Calibrator Settings screen (110) with element 111 indicating the title/header area. The screen shows a table with columns: POSITION, USE, NUMBER OF..., CONTAINER TYPE, COMMENT, Lot No., CONTENT, with rows C-01 through C-15 listing calibrator settings for various biochemical items.]*

FIG. 2

*[Figure 2: Control Settings screen (120) with elements 121 and 122 indicating portions of the interface. Shows Control Sample Settings on the left, an Item Table in the middle with numbered items (1.UIBC, 3.LIP, 4.CK-MB, 5.LAP, etc.), and an Item List on the right.]*

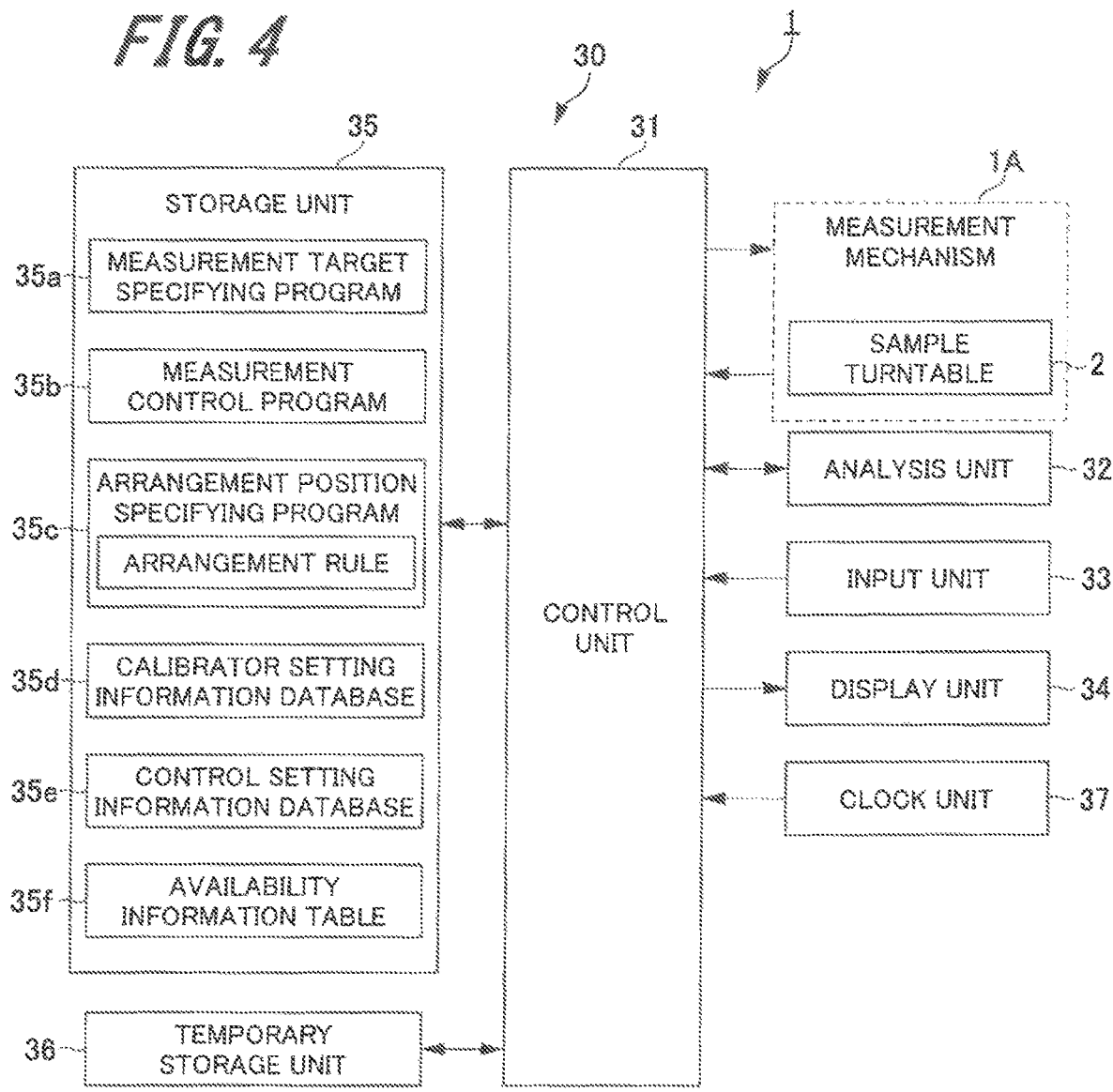

FIG. 5

CALIBRATOR SETTINGS — 40

ITEM SELECTION: 601.AFP — 41

NUMBER OF LEVELS OF CALIBRATOR: 2

LOT: 6071

EXPIRATION DATE: 2016/07/31 — 42

| POINT | LOT | SERIAL NO. | CONCENTRATION VALUE | EXPIRATION DATE | RACK POSITION | NUMBER OF MEASUREMENTS | CONTAINER PROFILE |
|---|---|---|---|---|---|---|---|
| 1 | 6071 | 0001 | 0.0 | 2016/07/31 | | 5 | 7mL Tube |
| 2 | | | | | | | |
| 3 | | | | | | | |
| 4 | | | | | | | |
| 5 | | | | | | | |
| 6 | 6071 | 0001 | 2000.0 | 2016/07/31 | | 5 | 7mL Tube |
| 7 | | | | | | | |
| 8 | | | | | | | |

Buttons — 45: SAVE, PRINT, OUTPUT FILE, DELETE, INPUT BARCODE, CLOSE

FIG. 6

CONTROL SETTINGS — 50

1.AFP L — 51

SAMPLE INFORMATION
- CONTROL NAME: AFP L
- LOT: 001
- EXPIRATION DATE: NO EXPIRATION
- RACK POSITION:
- COMMENT: AFP L
- SAMPLE MATERIAL: SERUM
- CONTAINER PROFILE: 7mL Tube
- NUMBER OF MEASUREMENTS: 1

ITEM SELECTION

| No | ITEM NO | ITEM NAME | MEAN VALUE | STANDARD DEVIATION |
|---|---|---|---|---|
| 1 | 601 | AFP | 1.00 | 1.00 |
| 2 | | | | |
| 3 | | | | |
| 4 | | | | |
| 5 | | | | |
| 6 | | | | |
| 7 | | | | |
| 8 | | | | |
| 9 | | | | |
| 10 | | | | |
| 11 | | | | |

Buttons — 55: SAVE, PRINT, OUTPUT FILE, DELETE, COPY, CHANGE LOT, CLOSE

FIG. 7

SELECTION FROM ITEM — CALIBRATOR/CONTROL

An item on which calibration/control measurement is performed is selected.
A full set of calibrators and all controls for the selected item are designated as being measured.
A calibrator that is determined by the system to be unnecessary is not designated as being measured.

SELECTION OF ITEM:

| 601.AFP | 606.PSA | 608.PG-I | 609.PG-II | 617.CYFRA |
|---|---|---|---|---|
| 621.TSH | 622.FT3 | 623.FT4 | 629.TRAb | |
| 650.BNP | 656.C-pepS | 657.C-pepU | | |
| 687.HBsAg | 688.HBsAgA | 689.HBsAgB | | |
| 901.PG RATIO | 908HBsAgRATIO | | | |

CALIBRATOR/CONTROL ORDER:

| ITEM | REAGENT | CALIBRATOR/CONTROL |
|---|---|---|
| 601.AFP | IN USE | Calib1 QC |
| 606.PSA | IN USE | Calib1 QC |
| 629.TRAb | IN USE | Calib QC |

CANCEL    < RETURN   COMPLETE SELECTION   NEXT >

FIG. 10

![Figure 10 — screen 70 titled "CONFIRMATION OF MEASUREMENT POSITION / CALIBRATOR/CONTROL" showing a table with columns TYPE (72), POSITION (73), SAMPLE (74), LOT (75), AMOUNT OF USE OF SAMPLE [μL] (76), and a circular rack diagram (2) with positions numbered around it, a MOVE NEAR button (78), legend for CALIBRATOR and CONTROL, CANCEL, RETURN, and COMPLETE SETTING SAMPLE (77) buttons.]

| TYPE | POSITION | SAMPLE | LOT | AMOUNT OF USE OF SAMPLE [μL] |
|---|---|---|---|---|
| ⊘ | ST-01 | AFP/1 | 6113 | 10.0 |
| ⊘ | ST-02 | AFP/6 | 6113 | 10.0 |
| ⊘ | ST-03 | PSA/1 | 6103 | 50.0 |
| ⊘ | ST-07 | PSA/6 | 6103 | 50.0 |
| ⊕ | ST-08 | AFP-L | 6113 | 10.0 |
| ⊕ | ST-09 | AFP-H | 6113 | 10.0 |
| ⊕ | ST-10 | TRAb-L | 6103 | 50.0 |
| ⊕ | ST-11 | TRAb-H | 6103 | 50.0 |

Please set a calibrator/control at a specified position.

⊘ CALIBRATOR
⊕ CONTROL

FIG. 11

Screen 80 — CONFIRMATION OF MEASUREMENT POSITION / CALIBRATOR/CONTROL

| TYPE | POSITION | SAMPLE | LOT | AMOUNT OF USE OF SAMPLE [μL] |
|---|---|---|---|---|
| ⊘ | 00001-1 | AFP/1 | 6071 | 50.0 |
| ⊘ | 00001-2 | AFP/6 | 6071 | 50.0 |

Please check a calibrator/control at a specified position. Please press the COMPLETE button and then deliver the rack.

No.00001

CANCEL    < RETURN    COMPLETE (84)

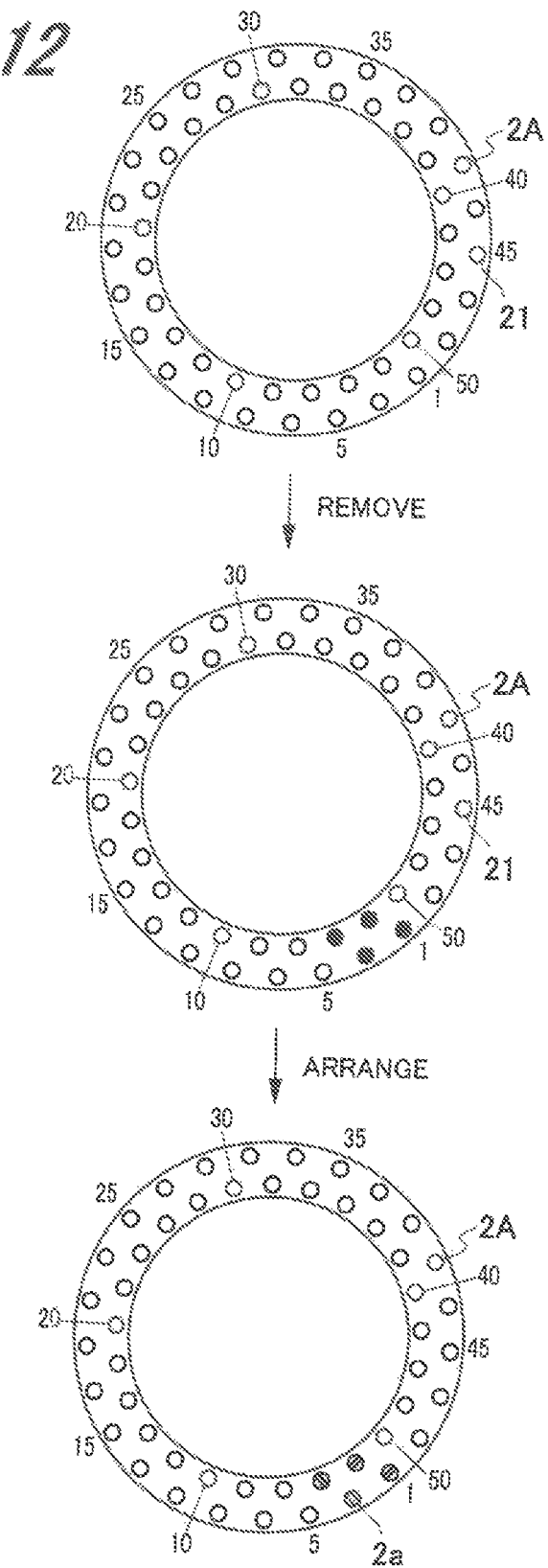

AUTOMATIC ANALYZER AND NON-TRANSITORY COMPUTER-READABLE RECORDING MEDIUM STORING PROGRAM

BACKGROUND OF THE INVENTION

Field of the Invention

The present invention relates to an automatic analyzer and a non-transitory computer-readable recording medium storing a program for analyzing components contained in samples.

Description of Related Art

Biochemical analyzers that analyze various components contained in samples (general samples) such as blood and urine are known as automatic analyzers. In such a biochemical analyzer, a sample such as serum or urine is diluted under certain conditions and then a certain amount of the diluted sample is dispensed into a reaction container. In the reaction container (cuvette), a reagent corresponding to an analysis item and the sample are mixed and are allowed to react with each other. Then, the biochemical analyzer measures the absorbance of the diluted sample dispensed into the reaction container and converts the absorbance to a concentration to analyze components (substances to be measured) contained in the sample.

To maintain the measurement accuracy of a sample, a calibrator (standard sample) and a control (control sample) are typically measured before the measurement of the sample. When starting measurement by using an automatic analyzer such as a biochemical analyzer, an operator determines for which item to perform calibration measurement and/or control measurement. In typical facilities, calibration measurement and control measurement are not performed for all items or all concentrations every day. In particular, the implementation of calibration measurement differs depending on the facility or operator, for example, "calibration measurement is performed once a week", or "calibration measurement is performed when the measurement result of control measurement becomes inaccurate".

To perform calibration measurement and control measurement, the operator first arranges a calibration sample (calibrator) and a control sample (control) on a turntable or rack for arranging samples. The positions at which samples are to be arranged are pre-assigned on a setting screen by the operator, and the operator arranges the calibration sample and the control sample in accordance with the settings when performing measurement.

FIG. 1 illustrates an example of a calibrator setting screen of the related art (existing model), and FIG. 2 illustrates an example of a control setting screen of the related art (existing model). A calibrator setting screen 110 illustrated in FIG. 1 includes a "position" field 111 indicating the position on a turntable. The calibrator setting screen 110 is based on a method in which a calibration sample (calibrator) for each item is assigned to each position on a turntable.

A control setting screen 120 illustrated in FIG. 2 has an area 121 for displaying control sample setting information. The area 121 for displaying control sample setting information includes a "position number" field 122 indicating a position on a turntable. The control setting screen 120 is also based on a method in which a control sample for each item is assigned to each position on a turntable. Using the setting screens illustrated in FIGS. 1 and 2, the operator pre-assigns the arrangement positions of calibrators and controls to the individual positions.

There is known a technique for displaying, on a setting screen that reflects a schematic view of a turntable (sample disk or reagent tray), a position at which a sample or a reagent container can be additionally placed.

Japanese Unexamined Patent Application Publication No. 08-86784 discloses an automatic analyzer. The automatic analyzer includes a storage unit that stores information indicating whether each position in a sample-container array unit is available, a determination unit that determines at which position a sample can be additionally placed in accordance with the information, and a display unit that displays on a screen a position at which a sample can be placed.

Japanese Unexamined Patent Application Publication No. 2007-315970 discloses an analyzer. The analyzer includes an identification means that identifies the position and size of an available area where a new reagent container can be held, and a display means that displays the position and size of the available area identified by the identification means.

The techniques of the related art require an operator to preset the arrangement positions of calibrators and controls, and involve a risk that the operator might set wrong settings and fail in measurement if the operator is not skilled in setting the positions.

Recently, there have been an increasing number of demands for specifications that allow even personnel who are not conversant with using an automatic analyzer, such as inexperienced operators or persons on night duty other than personnel in charge of the automatic analyzer, to easily operate the analyzer. In addition, due to the need for setting and maintaining a number of arrangement positions corresponding to the number of registered calibrators and controls in advance, a large number of settings are set. In facilities where measurement is performed using racks, there is a further need to prepare a number of racks necessary for registration of calibrators and controls, including calibrators or controls that are measured a few times a year.

None of the techniques described in Japanese Unexamined Patent Application Publication Nos. 08-86784 and 2007-315970 allows an automatic analyzer to automatically set an arrangement position of each sample when a sample (calibrator or control) necessary to perform measurement for selected measurement content is not arranged on a turntable.

SUMMARY OF THE INVENTION

Accordingly, there is a demand for a technique for automatically determining, using an automatic analyzer, the arrangement position of a sample necessary to perform measurement for selected measurement content when the sample is not arranged on a turntable and presenting the arrangement position to an operator.

An automatic analyzer according to an aspect of the present invention includes a sample-container array unit having positions at which one or more containers each containing a sample are arranged, a display unit that displays an item selection screen for selecting an item on which measurement is to be performed, an input unit operable to select, on the item selection screen, an item on which measurement is to be performed, and an availability information holding unit that holds availability information, the availability information being information indicating whether each of the positions in the sample-container array unit is available. The automatic analyzer further includes a control unit. The control unit performs a process when a sample necessary to perform measurement for measurement content selected on the item selection screen is not arranged in the sample-container array unit, the process including referring to the measurement content selected on the item selection screen and the availability information held in the availability information holding unit, specifying a position among the positions in the sample-container array unit at which a container containing the sample necessary to perform measurement for the selected measurement content is to be arranged in accordance with a specified arrangement rule, and causing the display unit to display information on the specified position in the sample-container array unit.

According to at least one aspect of the present invention, when a sample necessary to perform measurement for selected measurement content is not arranged in a sample-container array unit, an automatic analyzer can automatically determine the arrangement position of the sample and can present the arrangement position to an operator without requiring the operator to preset the arrangement position of the sample. This may avoid confusion of an inexperienced operator, for example, during an arrangement operation. As a result, wrong settings or wrong operations may be reduced and measurements such as calibration measurement and control measurement can be accurately performed.

Objects, configurations, and advantages other than those described above will become apparent from the description of the following embodiments.

BRIEF DESCRIPTION OF THE DRAWINGS

FIG. 1 illustrates a calibrator setting screen of the related art;

FIG. 2 illustrates a control setting screen of the related art;

FIG. 4 is a block diagram illustrating an example internal configuration of a computer according to the first embodiment of the present invention;

FIG. 5 is an explanatory diagram illustrating an example of a calibrator setting screen according to the first embodiment of the present invention;

FIG. 6 is an explanatory diagram illustrating an example of a control setting screen according to the first embodiment of the present invention;

FIG. 7 is an explanatory diagram illustrating an example of an item selection screen at the start of measurement according to the first embodiment of the present invention;

FIG. 10 is an explanatory diagram illustrating an example of a position specifying screen at the start of measurement according to the first embodiment of the present invention;

FIG. 11 is an explanatory diagram illustrating an example of a rack position specifying screen at the start of measurement according to a second embodiment of the present invention;

FIG. 12 is an explanatory diagram illustrating the arrangement of calibrators/controls according to a third embodiment of the present invention.

DESCRIPTION OF THE INVENTION

Figure 3:
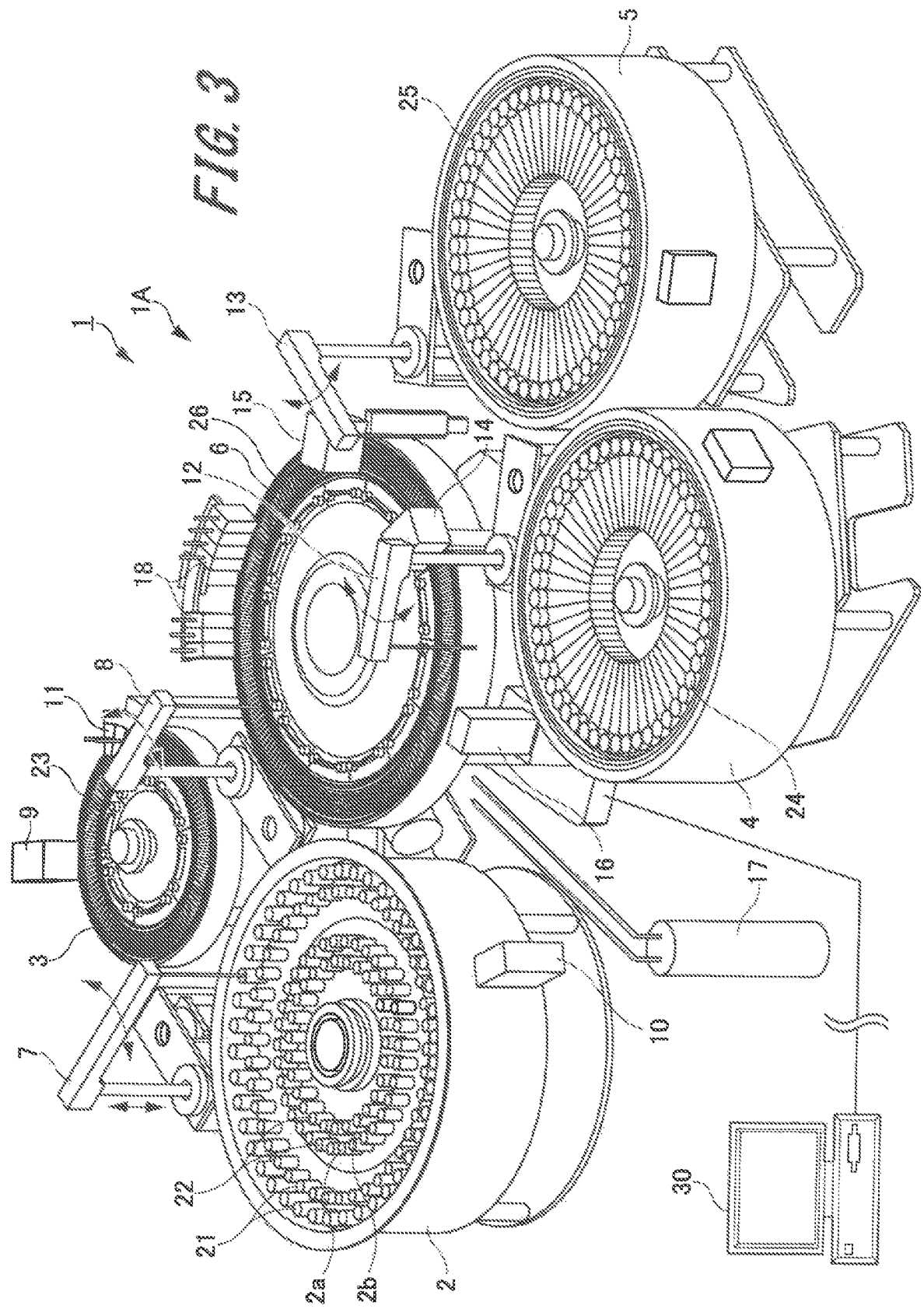
FIG. 3 is an explanatory diagram schematically illustrating an automatic analyzer according to a first embodiment of the present invention.

Exemplary embodiments of the present invention will be described hereinafter with reference to the accompanying drawings. In the drawings, constituent elements having substantially the same function or configuration are assigned the same numeral and are not repeatedly described.

1. First Embodiment

Example Configuration of Automatic Analyzer

An apparatus illustrated in FIG. 3 is a biochemical analyzer 1, which is applicable as an example of an automatic analyzer according to an embodiment of the present invention. The biochemical analyzer 1 is an apparatus that automatically measures the amounts of specific components contained in a biological sample such as blood or urine.

As illustrated in FIG. 3, the biochemical analyzer 1 includes a measurement mechanism 1A and a computer 30. The measurement mechanism 1A is an example of a measurement unit. The measurement mechanism 1A includes a sample turntable 2, a dilution turntable 3, a first reagent turntable 4, a second reagent turntable 5, and a reaction turntable 6. The measurement mechanism 1A further includes a sample dilution pipette 7, a sampling pipette 8, a dilution mixing device 9, a dilution washing device 11, a first reagent pipette 12, a second reagent pipette 13, a first reaction mixing device 14, a second reaction mixing device 15, a multi-wavelength photometer 16, a thermostatic bath 17, and a reaction-container washing device 18.

The sample turntable 2 (an example of a sample-container array unit) has a container shape that is substantially cylindrical and that has an opening at one end in an axial direction thereof. The sample turntable 2 accommodates a plurality of sample containers 21 and a plurality of diluent containers 22. The sample turntable 2 has an inner portion in which calibrators 2a (standard samples) and controls 2b (control samples) are placed. Part of the inner portion (two rows in the inner portion) of the sample turntable 2 is kept cool for the purpose of mainly allowing the calibrators 2a and the controls 2b to remain cool. The sample containers 21 contain samples including blood, urine, and so on. The diluent containers 22 contain special diluents other than physiological saline solution, which is a normal diluent. It should be noted that when the sample turntable 2 is driven, both the inner portion and an outer portion of the sample turntable 2 are simultaneously driven.

The plurality of sample containers 21 are arranged side by side at predetermined intervals along the circumference of the sample turntable 2. The sample containers 21, which are arranged side by side along the circumference of the sample turntable 2, are disposed in two rows with a predetermined interval therebetween in the radial direction of the sample turntable 2.

The plurality of diluent containers 22 are arranged more inward in the radial direction of the sample turntable 2 than the rows of the sample containers 21. Similarly to the plurality of sample containers 21, the plurality of diluent containers 22 are also arranged side by side at predetermined intervals along the circumference of the sample turntable 2. The diluent containers 22, which are arranged side by side along the circumference of the sample turntable 2, are disposed in two rows with a predetermined interval therebetween in the radial direction of the sample turntable 2.

The plurality of sample containers 21 and the plurality of diluent containers 22 may not necessarily be arranged in two rows and may be arranged in one row or three or more rows in the radial direction of the sample turntable 2.

The sample turntable 2 is supported so as to be rotatable along the circumference thereof by a driving mechanism (not illustrated). The sample turntable 2 is driven by the driving mechanism (not illustrated) to rotate along the circumference thereof at a predetermined speed over each predetermined angle range. The dilution turntable 3 is disposed near the sample turntable 2.

The sample turntable 2 has a sample barcode reader 10 on a side surface thereof. The sample barcode reader 10 reads barcodes on side surfaces of the containers accommodated in the sample turntable 2, namely, the sample containers 21, the diluent containers 22, the containers of the calibrators 2*a*, and the containers of the controls 2*b*. A control unit 31 (see FIG. 4, described below) manages the samples and diluents that are accommodated in the sample turntable 2 on the basis of information read by the sample barcode reader 10 (for example, reflects the read information in an availability information table 35*f* illustrated in FIG. 4 described below).

Similarly to the sample turntable 2, each of the dilution turntable 3, the first reagent turntable 4, the second reagent turntable 5, and the reaction turntable 6 also has a container shape that is substantially cylindrical and that has an opening at one end in an axial direction thereof. The dilution turntable 3 and the reaction turntable 6 are each driven by a driving mechanism (not illustrated) to rotate at a predetermined speed over each predetermined angle range along the circumference thereof. The reaction turntable 6 is set so as to rotate substantially one turn along the circumference thereof through one or more rotation operations (for example, rotate approximately ⅓ or more turns during a single rotation operation).

The dilution turntable 3 accommodates a plurality of dilution containers 23, which are arranged side by side along the circumference of the dilution turntable 3. Each of the dilution containers 23 contains a sample that is sucked from one of the sample containers 21 arranged on the sample turntable 2 and that is diluted (this sample is hereinafter referred to as a "diluted sample").

The first reagent turntable 4 accommodates a plurality of first reagent containers 24, which are arranged side by side along the circumference of the first reagent turntable 4. The second reagent turntable 5 accommodates a plurality of second reagent containers 25, which are arranged side by side along the circumference of the second reagent turntable 5. Each of the first reagent containers 24 contains a concentrated first reagent, and each of the second reagent containers 25 contains a second reagent.

The first reagent turntable 4, the first reagent containers 24, the second reagent turntable 5, and the second reagent containers 25 are maintained at a predetermined temperature by a cooler mechanism (not illustrated). Thus, the first reagents contained in the first reagent containers 24 and the second reagents contained in the second reagent containers 25 are kept cool at a predetermined temperature.

The reaction turntable 6 is arranged between the dilution turntable 3 and the two reagent turntables, namely, the first reagent turntable 4 and the second reagent turntable 5. The reaction turntable 6 accommodates a plurality of reaction containers 26, which are arranged side by side along the circumference of the reaction turntable 6. In each of the reaction containers 26, a diluted sample sampled from one of the dilution containers 23 on the dilution turntable 3, the first reagent sampled from one of the first reagent containers 24 on the first reagent turntable 4, and the second reagent sampled from one of the second reagent containers 25 on the second reagent turntable 5 are injected. The diluted sample, the first reagent, and the second reagent are mixed and allowed to react in the reaction container 26.

The sample dilution pipette 7 (an example of a sample injection unit) is arranged near the sample turntable 2 and the dilution turntable 3. The sample dilution pipette 7 is supported by a dilution-pipette driving mechanism (not illustrated) so as to be movable in the axial direction of the sample turntable 2 and the dilution turntable 3 (for example, in the vertical direction). The sample dilution pipette 7 is also supported by the dilution-pipette driving mechanism so as to be rotatable in a horizontal direction that is substantially parallel to the openings in the sample turntable 2 and the dilution turntable 3. The horizontal rotation of the sample dilution pipette 7 allows the sample dilution pipette 7 to reciprocate between the sample turntable 2 and the dilution turntable 3. When the sample dilution pipette 7 moves between the sample turntable 2 and the dilution turntable 3, the sample dilution pipette 7 passes through a washing device (not illustrated).

The operation of the sample dilution pipette 7 will now be described.

When the sample dilution pipette 7 moves to a predetermined position above the opening in the sample turntable 2, the sample dilution pipette 7 moves downward in the axial direction of the sample turntable 2 and inserts a pipette tip attached to an end thereof into the corresponding one of the sample containers 21. At this time, a sample pump (not illustrated) is activated to allow the sample dilution pipette 7 to suck a predetermined amount of the sample contained in the sample container 21. Then, the sample dilution pipette 7 moves upward in the axial direction of the sample turntable 2 and takes the pipette tip from the sample container 21. Then, the sample dilution pipette 7 rotates in the horizontal direction and moves to a predetermined position above the opening in the dilution turntable 3.

Then, the sample dilution pipette 7 moves downward in the axial direction of the dilution turntable 3 and inserts the pipette tip into a predetermined one of the dilution containers 23. Then, the sample dilution pipette 7 discharges the sucked sample and a predetermined amount of diluent (for example, physiological saline solution), which is supplied from the sample dilution pipette 7 itself, into the dilution container 23. As a result, the sample is diluted to a concentration that is a predetermined number of times the original concentration in the dilution container 23. After that, the pipette tip of the sample dilution pipette 7 is washed by the washing device.

The sampling pipette 8 (an example of a sample injection unit) is arranged between the dilution turntable 3 and the reaction turntable 6. The sampling pipette 8 is supported by a sampling-pipette driving mechanism (not illustrated) so as to be movable in the axial direction of the dilution turntable 3 (in the vertical direction) and rotatable in the horizontal direction in a way similar to that of the sample dilution pipette 7. The sampling pipette 8 reciprocates between the dilution turntable 3 and the reaction turntable 6.

The sampling pipette 8 inserts a pipette tip attached to an end thereof into one of the dilution containers 23 on the dilution turntable 3 and sucks a predetermined amount of the diluted sample. Then, the sampling pipette 8 discharges the sucked diluted sample into one of the reaction containers 26 in the reaction turntable 6.

The first reagent pipette 12 (an example of a first reagent injection unit) is arranged between the reaction turntable 6 and the first reagent turntable 4, and the second reagent pipette 13 is arranged between the reaction turntable 6 and the second reagent turntable 5. The first reagent pipette 12 is supported by a first reagent pipette driving mechanism (not illustrated) so as to be movable in the axial direction of the reaction turntable 6 (in the vertical direction) and rotatable in the horizontal direction. The first reagent pipette 12 reciprocates between the first reagent turntable 4 and the reaction turntable 6.

The first reagent pipette 12 inserts a pipette tip attached to an end thereof into one of the first reagent containers 24 on the first reagent turntable 4 and sucks a predetermined amount of the first reagent. Then, the first reagent pipette 12 discharges the sucked first reagent into one of the reaction containers 26 on the reaction turntable 6.

Similarly to the first reagent pipette 12, the second reagent pipette 13 (an example of a second reagent injection unit) is supported by a second reagent pipette driving mechanism (not illustrated) so as to be movable in the axial direction of the reaction turntable 6 (in the vertical direction) and rotatable in the horizontal direction. The second reagent pipette 13 reciprocates between the second reagent turntable 5 and the reaction turntable 6.

The second reagent pipette 13 inserts a pipette tip attached to an end thereof into one of the second reagent containers 25 on the second reagent turntable 5 and sucks a predetermined amount of the second reagent. Then, the second reagent pipette 13 discharges the sucked second reagent into one of the reaction containers 26 on the reaction turntable 6.

The dilution mixing device 9 and the dilution washing device 11 are arranged around the dilution turntable 3. The dilution mixing device 9 inserts a mixing rod (not illustrated) into one of the dilution containers 23 and mixes the sample and the diluent.

The dilution washing device 11 is a device that washes the dilution containers 23 after the diluted samples have been sucked by the sampling pipette 8. The dilution washing device 11 has a plurality of dilution-container washing nozzles. The plurality of dilution-container washing nozzles are connected to a liquid-waste pump (not illustrated) and a washing-agent pump (not illustrated). The dilution washing device 11 inserts the dilution-container washing nozzles into corresponding ones of the dilution containers 23 and drives the liquid-waste pump to suck the diluted samples remaining in the dilution containers 23 into the inserted dilution-container washing nozzles. Then, the dilution washing device 11 discharges the sucked diluted samples to a liquid-waste tank (not illustrated).

After that, the dilution washing device 11 supplies a washing agent from the washing-agent pump to the dilution-container washing nozzles and discharges the washing agent from the dilution-container washing nozzles into the corresponding ones of the dilution containers 23. The inside of the dilution containers 23 is washed using the washing agent. Then, the dilution washing device 11 sucks the washing agent into the dilution-container washing nozzles and dries the inside of the dilution containers 23.

The first reaction mixing device 14, the second reaction mixing device 15, and the reaction-container washing device 18 are arranged around the reaction turntable 6. The first reaction mixing device 14 inserts a mixing rod (not illustrated) into one of the reaction containers 26 and mixes the diluted sample and the first reagent. This enables the diluted sample and the first reagent to react uniformly and quickly. The configuration of the first reaction mixing device 14 is the same or substantially the same as that of the dilution mixing device 9 and is not described herein.

The second reaction mixing device 15 inserts a mixing rod (not illustrated) into one of the reaction containers 26 and mixes the diluted sample, the first reagent, and the second reagent. This enables the diluted sample, the first reagent, and the second reagent to react uniformly and quickly. The configuration of the second reaction mixing device 15 is the same or substantially the same as that of the dilution mixing device 9 and is not described herein.

The reaction-container washing device 18 is a device that washes the inside of the reaction containers 26 for which the test has been completed. The reaction-container washing device 18 has a plurality of reaction-container washing nozzles. The plurality of reaction-container washing nozzles are also connected to the liquid-waste pump (not illustrated) and the washing-agent pump (not illustrated) in a way similar to that of the dilution-container washing nozzles. The washing processes performed by the reaction-container washing device 18 are similar to those of the dilution washing device 11 described above and are not described herein.

The multi-wavelength photometer 16 is arranged near the reaction turntable 6 so as to face an outer wall of the reaction turntable 6. The multi-wavelength photometer 16 performs optical measurement on a diluted sample (including a standard sample) that is injected into one of the reaction containers 26 and is allowed to react with the first reagent and the second reagent, and outputs a measurement result indicating the amounts of various components in the sample as numerical data of the "absorbance" to detect the reaction state of the diluted sample. The multi-wavelength photometer 16 is connected to the computer 30.

The thermostatic bath 17 is also arranged near the reaction turntable 6. The thermostatic bath 17 is configured to always keep the temperature of the reaction containers 26 on the reaction turntable 6 constant.

Example Configuration of Computer

Next, an example configuration of the computer 30 will be described with reference to FIG. 4.

FIG. 4 is a block diagram illustrating an example internal configuration of the computer 30.

The computer 30 includes the control unit 31, an analysis unit 32, an input unit 33, a display unit 34, a storage unit 35, a temporary storage unit 36, and a clock unit 37, which are connected to a bus (not illustrated).

The control unit 31 is constituted by an arithmetic processing device such as a central processing unit (CPU) or a microcomputer. The control unit 31 is connected to each unit in the biochemical analyzer 1 (the measurement mechanism 1A) via an interface unit (not illustrated) and, for example, provides an instruction for an operation timing or transfers data to each unit to control the operation of each unit, thereby controlling the overall operation of the biochemical analyzer 1. The control unit 31 reads and executes a program stored in the storage unit 35 to control the operation of each unit in the biochemical analyzer 1. The control unit 31 is connected to the analysis unit 32. Upon receipt of the absorbances of the diluted samples in the reaction containers 26, which are obtained as a result of measurement by the multi-wavelength photometer 16 of the measurement mechanism 1A, the control unit 31 outputs the measurement results to the analysis unit 32.

The analysis unit 32 analyzes the component concentrations or the like of the samples on the basis of the measurement results obtained by the multi-wavelength photometer 16 and outputs analysis results to the control unit 31.

The input unit 33 accepts an operation input performed by the operator on the biochemical analyzer 1 and outputs an input signal to the control unit 31. Examples of the input unit 33 include a mouse, a keyboard, and a touch panel. The operator operates the input unit 33 to input information necessary for analysis, such as the types of samples to be measured, the number of samples, analysis items, and a time zone (a range of time points) in which analysis is performed. Each of the samples is assigned a detection ID that enables unique identification of the sample.

The display unit 34 displays an analysis result screen, a warning screen, an input screen for inputting various settings, and so on. Examples of the display unit 34 include a liquid crystal display device.

The storage unit 35 is an example of a recording medium and is constituted by, for example, an updatable/recordable semiconductor memory such as a flash memory (flash read-only memory (ROM)). Alternatively, the storage unit 35 may be implemented by, for example, a large-capacity internal recording device or a large-capacity recording device connected via a data communication terminal, such as a hard disk drive (HDD), or by an information storage medium such as a compact disc read-only memory (CD-ROM) and a reader thereof. The storage unit 35 stores analysis results, various programs necessary for the operation of the biochemical analyzer 1, data used to execute the programs, and so on. The storage unit 35 stores, for example, a measurement target specifying program 35a, a measurement control program 35b, an arrangement position specifying program 35c, a calibrator setting information database 35d, a control setting information database 35e, and the availability information table 35f.

The measurement target specifying program 35a is a program executed by the control unit 31 for, for example, allowing the operator to operate the input unit 33 to specify a sample or item on which measurement is to be performed. The control unit 31 executes the measurement target specifying program 35a to set a sample and item (such as reaction rate assay (RRA) or end point assay (EPA)) to be measured. The measurement target specifying program 35a is executed to designate a sample and an item as measurement targets. The operator may operate the input unit 33 to specify the time duration, time interval or time point (time zone), or the like over which or in which the measurement of the sample is to be performed, or, when a sample or an item is specified, a predetermined time duration, time interval or time point, or the like may be automatically set in accordance with the specified sample or item. The control unit 31 creates a measurement setting table (not illustrated) on the basis of the content specified in accordance with the measurement target specifying program 35a and stores the measurement setting table in the storage unit 35.

The measurement control program 35b is a program executed by the control unit 31 for performing measurement on a specified sample or item. The control unit 31 reads the content of an operation stored in the measurement setting table (not illustrated) and executes an operation based on the read content of the operation (measurement of a sample or item that is a measurement target). The measurement control program 35b is executed to measure a sample. Upon receipt of an instruction from the input unit 33 to start measurement, the control unit 31 immediately starts measurement.

The arrangement position specifying program 35c is a program for, when a sample (a calibrator or a control) necessary to perform measurement for measurement content selected on an item selection screen 60 (see FIG. 7, described below) is not arranged on the sample turntable 2, specifying a position on the sample turntable 2 at which a sample container for the sample (calibrator or control) is to be arranged. An arrangement position is specified in accordance with specified priority by referring to measurement content selected on the item selection screen 60 and availability information held in the availability information table 35f. The arrangement position specifying program 35c and the measurement target specifying program 35a may be combined into a single program.

The calibrator setting information database 35d (an example of a sample setting information holding unit) is a database that holds information about a variety of calibrators. The item selection screen 60 provides a mechanism to select a calibrator (item) on which measurement is to be performed from calibrator setting information held in the calibrator setting information database 35d.

The control setting information database 35e (an example of a sample setting information holding unit) is a database that holds information about a variety of controls. The item selection screen 60 provides a mechanism to select a control (item) on which measurement is to be performed from control setting information held in the control setting information database 35e.

The availability information table 35f (an example of an availability information holding unit) is a table that holds availability information. The availability information is information indicating whether each position on the sample turntable 2 is available.

The temporary storage unit 36 is constituted by a random access memory (RAM) such as an updatable/recordable flash memory. The temporary storage unit 36 temporarily stores a program or data read from the storage unit 35 by the control unit 31, the settings of some or all of various tables, measurement results, and so on.

The clock unit 37 measures time and notifies the control unit 31 of time. Examples of the clock unit 37 include a real time clock (RTC), which is an integrated circuit (IC) included in a typical personal computer or the like to output information on the current time and date.

Calibrator/Control Setting Screen

Next, calibrator and control setting screens will be described with reference to FIGS. 5 and 6, respectively. Information displayed and set on the calibrator setting screen is stored in the calibrator setting information database 35d, and information displayed and set on the control setting screen is stored in the control setting information database 35e.

Calibrator Setting Screen

FIG. 5 is an explanatory diagram illustrating an example of a calibrator setting screen according to a first embodiment.

A calibrator setting screen 40 has an item selection field 41. In the item selection field 41, information including "item number" and "item name" is displayed. When a pointer P (for example, an arrow pointer) is moved and clicked over the item selection field 41, a plurality of items are displayed. The plurality of items are displayed as a pull-down list (not illustrated), for example. The item selection field 41 is provided with an upward indicator (marked with a black up-pointing triangle) and a downward indicator (marked with a black down-pointing triangle) which can be operated to select a desired item from the pull-down list.

In FIG. 5, the item selection field 41 shows '601.AFP'. The '601' portion represents the item number of a calibrator and the 'AFP' portion represents the item name of the calibrator. When the operator selects an item, the "number of levels of calibrator", "lot", "expiration date", and "detailed information" are displayed. The number of levels of a calibrator is the number of different concentrations that are used to measure the calibrator. In FIG. 5, the number of levels of the calibrator is '2'.

As illustrated in FIG. 5, the "detailed information" on the selected item has a "point" field 42, a "lot" field, a "serial No." field, a "concentration value" field, an "expiration date" field, a "rack position" field 43, a "number of measurements" field, and a "container profile" field. The "point" field 42 includes a numerical value that indicates the measurement point of a calibrator, and the number of records of points corresponds to the number of levels. In the "rack position" field 43, a position on a rack, described below, is set. When the operator selects an item in the item selection field 41 and then presses a "Save" button 45, the selected item is set as an item on which measurement is performed, and is saved in the calibrator setting information database 35d.

In the calibrator setting screen 40, settings are set for each item. Unlike the calibrator setting screen 110 illustrated in FIG. 1, the calibrator setting screen 40 has no settings for assigning positions on the sample turntable 2.

Control Setting Screen

FIG. 6 is a diagram illustrating an example of a control setting screen according to the first embodiment.

A control setting screen 50 has a control selection field 51. In the control selection field 51, as in the case of calibrators, information including "item number" and "item name" is displayed. When the pointer P is moved and clicked over the control selection field 51, a plurality of items are displayed. The plurality of items are displayed as a pull-down list (not illustrated), for example. A desired item (control) can be selected from the pull-down list in the control selection field 51.

In FIG. 6, the control selection field 51 shows '1.AFP L'. The '1' portion represents the item number of a control, and the 'AFP L' portion represents the item name of the control. When the operator selects an item, "sample information" is displayed as detailed information on the item. The sample information includes "control name", "lot", "expiration date", "rack position", "comment", "sample material", "container profile", and "number of measurements". The control setting screen 50 also has an "item selection" display area for displaying an item of a calibrator corresponding to a selected control. In the "item selection" display area, information about "item No.", "item name", "mean value", and "standard deviation" is displayed. When the operator selects a control and then presses a "Save" button 55, the selected control is set as an item on which measurement is performed, and is saved in the control setting information database 35e.

In the control setting screen 50, as in the calibrator setting screen 40, settings are set for each item (control). The control setting screen 50 has no settings for assigning positions on the sample turntable 2.

Item Selection Screen at Start of Measurement

Next, a description will be given of an item selection screen for selecting an item on which measurement is to be performed from among calibrators and controls.

FIG. 7 is an explanatory diagram illustrating an example of an item selection screen at the start of measurement according to the first embodiment.

The item selection screen 60 shows a message that prompts selection of an item and that draws attention so as to ensure selection (instructions). In FIG. 7, the message "A full set of calibrators and all controls for the selected item are designated as being measured" is displayed. As depicted in FIG. 5, when the number of levels of a calibrator is '2', a full set of calibrators are calibrators at two levels. All controls are controls having a plurality of concentrations. For example, when a control having a high concentration and a control having a low concentration are present, all controls are the two controls.

The item selection screen 60 has a left portion in which a selection-of-item field 61 is displayed, and a right portion in which a calibrator/control order list 62 is displayed. The selection-of-item field 61 shows the plurality of calibrators and controls saved in the calibrator setting information database 35d and the control setting information database 35e. When the operator operates the input unit 33 and selects an item on which measurement is to be performed, the selected item is displayed in the calibrator/control order list 62.

The calibrator/control order list 62 includes an "item" field 63, a "reagent" field 64, and a "calibrator/control" field 65. The "item" field 63 shows an item selected by the operator. The "reagent" field 64 shows information indicating whether the corresponding reagent (sample) is in use. For a reagent displayed as being 'in use', measurement is performed. The "calibrator/control" field 65 shows which of a calibrator and a control for the selected item to measure.

When 'Calib' or 'QC' in the "calibrator/control" field 65 is clicked with the pointer P, the clicked item (calibration or control) is displayed as highlighted, and then measurement is performed. In FIG. 7, 'Calib' or 'QC' for '601.AFP', 'Calib' for '606.PSA', and 'QC' for '629.TRAb' are selected.

When the operator selects an item and then clicks a "Complete selection" button 66 displayed in a lower portion of the item selection screen 60, the control unit 31 terminates acceptance of an item. Then, when a "Next" button is clicked and a predetermined operation is performed, the control unit 31 specifies the arrangement position of a calibrator/control for the selected item or performs calibration measurement and/or control measurement for the selected item.

In FIG. 7, the message prompting selection of an item, described above, and a message indicating the presence of a calibrator that is not designated as being measured, as determined by the system, are displayed. Thus, the operator is able to know in advance that there is a possibility that no calibrator measurement might be performed in accordance with the determination of the system.

Workflow for Position Specifying Process

Next, a description will be given of a workflow for a position specifying process performed by the biochemical analyzer 1.

Figure 8:
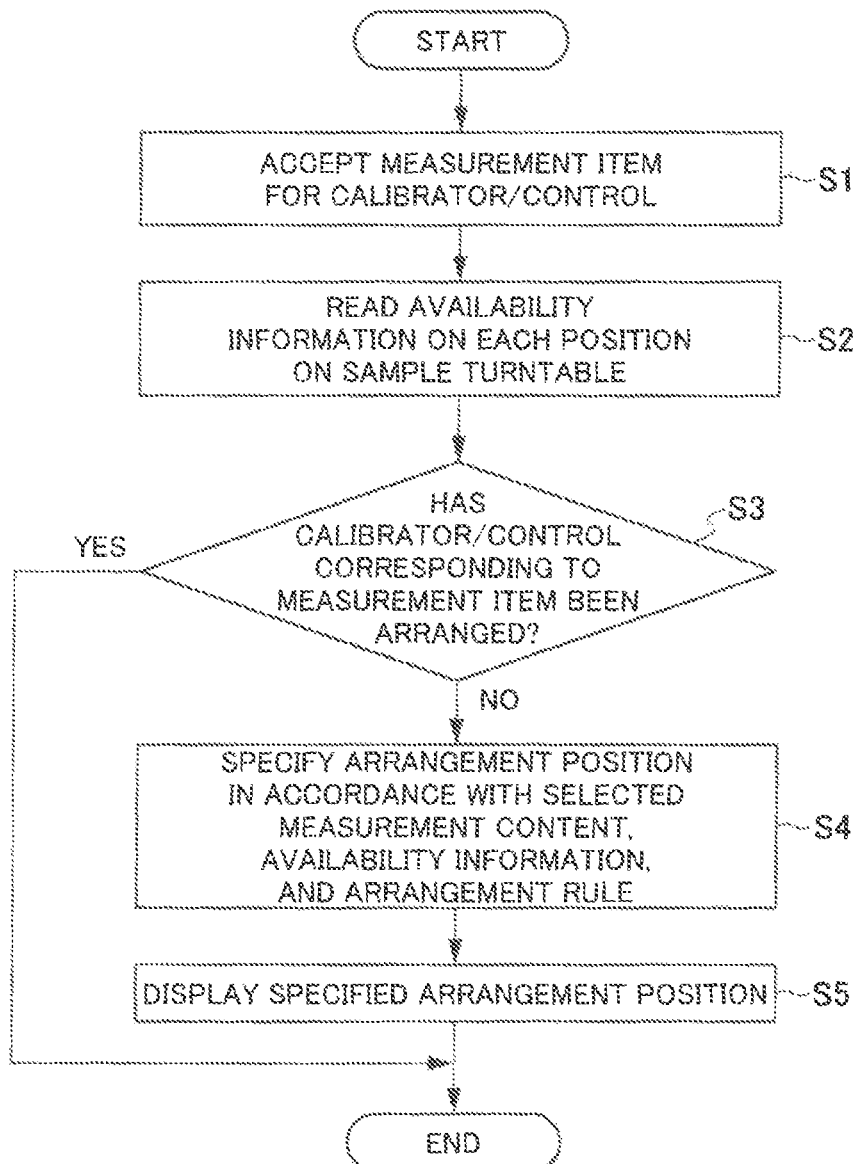
FIG. 8 is a flowchart illustrating a workflow for a position specifying process according to the first embodiment of the present invention.

FIG. 8 is a flowchart illustrating a workflow for a position specifying process according to the first embodiment.

First, when the operator operates the input unit 33 and selects a menu for specifying a sample or item on which measurement is to be performed, the control unit 31 executes the measurement target specifying program 35a and accepts the selection of a sample or an item. When the operator desires to select an item for a calibrator/control, the control unit 31 refers to the calibrator setting information database 35d and the control setting information database 35e and displays the item selection screen 60 (FIG. 7) on the display unit 34. Then, the control unit 31 accepts selection of an item for a calibrator/control on the item selection screen 60 (S1).

Then, when the "Complete selection" button 66 is clicked, the control unit 31 reads availability information on each position on the sample turntable 2 from the availability information table 35f (S2).

Then, the control unit 31 determines whether a calibrator/control corresponding to the selected item (measurement item) has been arranged on the sample turntable 2 (S3). If the calibrator/control has been arranged (YES in S3), the control unit 31 exits the position specifying process.

If the calibrator/control has not been arranged (NO in S3), the control unit 31 executes the arrangement position specifying program 35c. Then, the control unit 31 refers to the selected item (measurement content) and the availability information on the sample turntable 2 and specifies a position on the sample turntable 2 at which the calibrator/control is to be arranged (this position is hereinafter referred to as an "arrangement position") in accordance with a specified arrangement rule (S4). The arrangement rule is described in the arrangement position specifying program 35c, for example.

Arrangement Rule for Specifying Position

Figure 9:
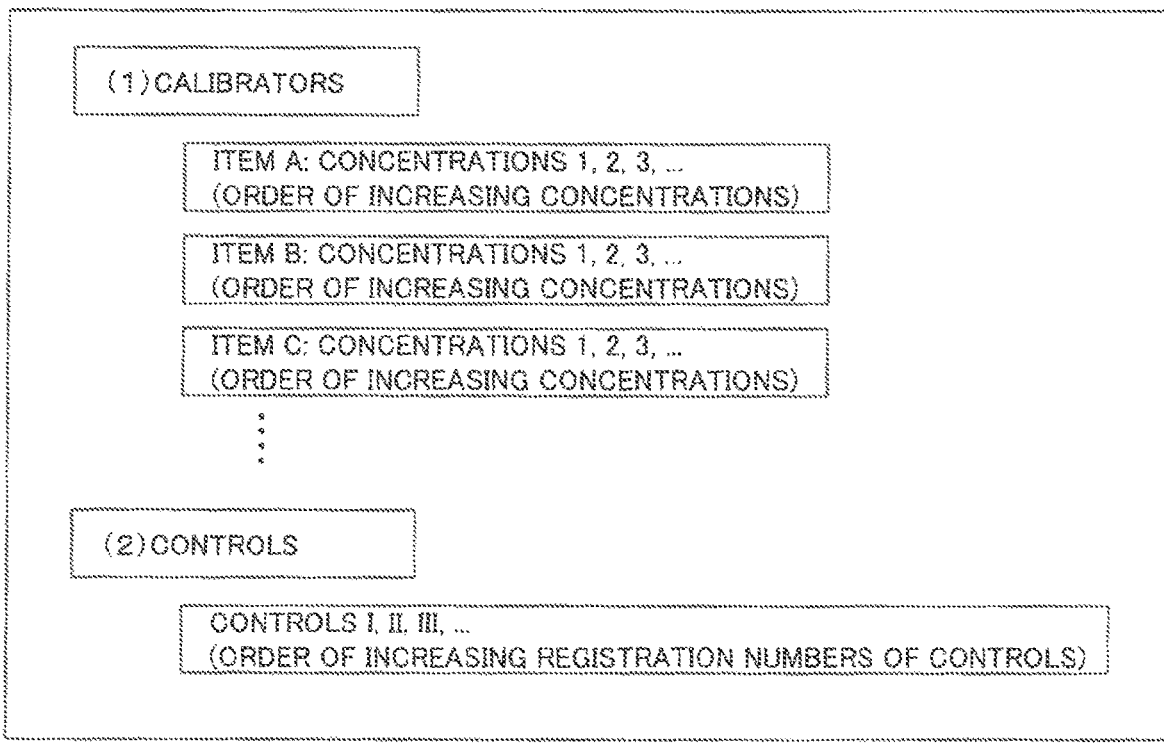
FIG. 9 is an explanatory diagram illustrating arrangement rules for specifying a position according to the first embodiment of the present invention.

FIG. 9 is an explanatory diagram of arrangement rules for specifying a position according to the first embodiment.

In this embodiment, the following rules (1) and (2) are defined as arrangement rules.

(1) Calibrator: order of increasing item numbers and order of increasing concentrations (2) Control: order of increasing item numbers As a result of summarizing the rules (1) and (2), the order of priority depicted in FIG. 9 is obtained. The control unit 31 sequentially assigns the calibrators 2a/controls 2b to available positions in accordance with the order of priority. The order of items A, B, C, . . . for the calibrators is determined on the basis of the order of increasing item numbers (the order in which the items are set). The order of controls I, II, III, . . . is determined on the basis of the order of increasing item numbers of the controls. In the case of controls, a plurality of items can be measured with a single control.

The arrangement rules described above prevent calibrators and controls from being mixed and allow calibrators to be arranged in the order of increasing concentrations for each item. Thus, unlike a random setting of the arrangement positions of calibrators and controls, the effect of reducing incorrect arrangements can be achieved.

The arrangement positions of calibrators and controls may be specified in reverse order. That is, the arrangement positions of controls may be specified first, and then the arrangement positions of calibrators may be specified.

In FIG. 9, arrangement rules are based on the order of increasing item numbers. Alternatively, the arrangement rules may be based on any other order of priority.

Referring back to FIG. 8, then, the control unit 31 performs a process for displaying a screen for confirming the specified arrangement position (measurement position) (see FIG. 10, described below) on the display unit 34 (S5). After the processing of step S5, the control unit 31 exits the position specifying process.

Position Specifying Screen at Start of Measurement

FIG. 10 is an explanatory diagram illustrating an example of a position specifying screen at the start of measurement according to the first embodiment.

A position specifying screen 70 is a screen for confirming an arrangement position (measurement position). The position specifying screen 70 has a left portion in which an arrangement position list 71 is displayed. The position specifying screen 70 has a right portion in which a schematic view of the sample turntable 2 and the message "Please set a calibrator/control at a specified position" are displayed.

The arrangement position list 71 shows fields 72 to 76 respectively indicating "type", "position", "sample", "lot", and "amount of use of sample (µL)". The "type" is information indicating which of calibrator and control the measurement item is. In FIG. 10, an oblique-lines-in-circle mark represents a calibrator, and a cross-in-circle mark represents a control. The "position" indicates an arrangement position. For example, 'ST-01' represents the position numbered 1 on the sample turntable 2. The "sample" indicates the content of a sample. The "lot" indicates the lot number of a sample. The "amount of use of sample (µL)" indicates the quantity of sample used for measurement, which is expressed in microliters (µL).

The schematic view of the sample turntable 2 indicates the location and availability of each position. For example, the sample turntable 2 has positions numbered 1 (ST-01) to 50 (ST-50) at which containers can be arranged.

In the example illustrated in FIG. 10, the positions 'ST-01' to 'ST-03' and 'ST-07' on the sample turntable 2 are specified for calibrators 'AFP/1', 'AFP/6', 'PSA/1', and 'PSA/6'. Further, the positions 'ST-08' to 'ST-11' are specified for controls 'AFP-L', 'AFP-H', 'TRAb-L', and 'TRAb-H'. The positions 'ST-12' to 'ST-50', which are represented by hollow circles, are occupied by general samples, which are excluded from the arrangement positions of calibrators/controls. The positions 'ST-4' to 'ST-6', which are represented by solid circles, are positions not occupied by either general samples or calibrators/controls.

The operator arranges the calibrators 2a and the controls 2b at specified positions on the sample turntable 2 while checking the information on the arrangement positions that appears on the position specifying screen 70.

After the completion of the arrangement of all the calibrators 2a and the controls 2b, the operator clicks a "Complete setting sample" button 77, which is displayed in a lower portion of the position specifying screen 70. When the "Complete setting sample" button 77 is clicked, the control unit 31 executes the measurement control program 35b and performs calibration measurement and control measurement.

A "Move near" button 78, which is displayed in an inner portion of the schematic view of the sample turntable 2, is a button for rotating the sample turntable 2. When the calibrators 2a and the controls 2b are to be arranged, if the arrangement positions are positioned on the far side of the sample turntable 2, the operator may have to reach for the arrangement positions to arrange the calibrators 2a and the controls 2b, which is inconvenient in operability. Accordingly, when the "Move near" button 78 is clicked, the control unit 31 rotates the sample turntable 2 to allow the arrangement positions of the calibrators 2a and the controls 2b to move to the near side (i.e., the lower portion in FIG. 10). The positions on the sample turntable 2 in the biochemical analyzer 1 are made to match the positions on the sample turntable 2 displayed on the position specifying screen 70, which provides further increased operational efficiency.

Advantages of First Embodiment

According to the first embodiment configured in the manner described above, when a sample necessary to perform measurement for selected measurement content is not arranged in a sample-container array unit, an automatic analyzer can automatically determine the arrangement position of the sample and can present the arrangement position to an operator without requiring the operator to preset an arrangement position for each sample (for example, for each calibrator and control). This may avoid confusion of an inexperienced operator, for example, during an arrangement operation. As a result, wrong settings or wrong operations may be reduced and measurements such as calibration measurement and control measurement can be accurately performed.

2. Second Embodiment

The first embodiment provides an example in which the biochemical analyzer 1 automatically sets arrangement positions of calibrators/controls on the sample turntable 2. The biochemical analyzer 1 is also capable of performing automatic setting for racks. That is, after a measurement item is selected on the item selection screen 60 illustrated in FIG. 7, the control unit 31 automatically assigns a rack and arrangement positions on the rack.

FIG. 11 is an explanatory diagram illustrating an example of a rack position specifying screen at the start of measurement according to a second embodiment.

A position specifying screen 80 illustrated in FIG. 11 is a screen for confirming an arrangement position (measurement position) on a rack. The position specifying screen 80 has a left portion in which an arrangement position list 71 is displayed, and a right portion in which a schematic view of a rack 82 is displayed. In this example, the rack 82 has six positions.

In the arrangement position list 71, the first record in the "position" field 73 shows '00001-1', which indicates that the rack ID, which is unique identification information, is '00001' and the position number on the corresponding rack is '1'. In the example illustrated in FIG. 11, the positions '1' and '2' on the rack identified by the rack ID '00001' are specified for calibrators 'AFP/1' and 'AFP/6'.

In addition to the schematic view of the rack 82, the message "please check a calibrator/control at a specified position" is displayed in the right portion of the position specifying screen 80 for the rack. This warning message allows the operator to pay attention to whether a calibrator/control at a specified position is correct.

The control unit 31 reads a barcode 83 on a side surface of the rack 82 by using a barcode reader (not illustrated) and obtains a rack ID. The read rack ID is reflected in the availability information table 35f for the rack.

When a "Complete" button 84 is clicked, the control unit 31 executes the measurement control program 35b and performs calibration measurement and control measurement.

The position specifying screen 80 for the rack shows the message "please press the Complete button and then deliver the rack". This warning message allows the operator to be careful delivering the corresponding rack to a transport path or to a predetermined position in the biochemical analyzer 1 after pressing the "Complete" button 84.

The second embodiment described above achieves operations and effects similar to those of the first embodiment. When a rack is used, unlike the sample turntable 2, the "rack position" depicted in FIGS. 5 and 6 can be used to preset arrangement positions. Thus, the biochemical analyzer 1 automatically assigns a position to only a calibrator/control that is not set, in accordance with availability information on the rack. This is also applicable to a sample turntable.

3. Third Embodiment

In some cases, a single sample turntable 2 may be insufficient to mount calibrators and controls. In such cases, another sample turntable is used in addition to the sample turntable 2. That is, this embodiment is applied to a biochemical analyzer including two or more sample turntables.

FIG. 12 is an explanatory diagram of the arrangement of calibrators/controls according to a third embodiment. In the following description, in this embodiment, the biochemical analyzer 1 includes a sample turntable 2A in addition to the sample turntable 2.

Consideration is given to measures to address a case where the first sample turntable, namely, the sample turntable 2, is insufficient to mount calibrators and controls and the positions on the second sample turntable, namely, the sample turntable 2A, are also occupied by the sample containers 21 (upper part of FIG. 12). It is assumed here that insufficiency of four calibrators necessary for the measurement of a selected item occurs.

The operator removes a necessary number of sample containers 21 to free up necessary positions on the sample turntable 2A and performs a predetermined operation to inform the biochemical analyzer 1 of the completion of the removal action. In the middle part of FIG. 12, the positions '1' to '4' on the sample turntable 2A are made available.

After the operator has removed the sample containers 21, the control unit 31 rotates the sample turntable 2A, reads barcodes on containers arranged on the sample turntable 2A by using the sample barcode reader 10, and updates the availability information table 35f.

Then, the control unit 31 executes the processing of steps S2 to S5 in the position specifying process (FIG. 8) and designates the positions '1' to '4' as the arrangement positions for the four missing calibrators 2a. Then, the control unit 31 displays the resulting arrangement positions on the position specifying screen 70 (lower part of FIG. 12).

After the completion of calibration measurement, the control unit 31 displays a message on the position specifying screen 70, which prompts the operator to place the removed sample containers 21 at the initial positions again. It should be noted that the sample containers 21 may remain removed if the measurement of the removed sample containers 21 has been completed.

Other Examples

As other examples, the biochemical analyzer 1 (the control unit 31) may be configured to specify a sample container 21 to be removed in accordance with a determination standard such as whether measurement has been completed. Alternatively, the control unit 31 may perform control to regard a position at which a sample container 21 for which measurement has been completed is arranged as an available position and to specify an arrangement position. The operator may remove a sample container 21 or the like arranged at a position specified by the biochemical analyzer 1 and then arrange a missing calibrator/control at the arrangement position specified by the biochemical analyzer 1 in a way similar to that described above.

The third embodiment described above achieves the following operations and effects in addition to operations and effects similar to those of the first embodiment. That is, according to the third embodiment, a case where the sample turntable 2 has no position available for a calibrator/control necessary for the measurement of a selected item can be addressed by the operator (in accordance with a position specifying screen).

4. Fourth Embodiment

A fourth embodiment provides an example in which insufficiency of a calibrator necessary for the measurement of a selected item is addressed by using a rack configured to be removably attachable to the sample turntable 2.

Figure 13:
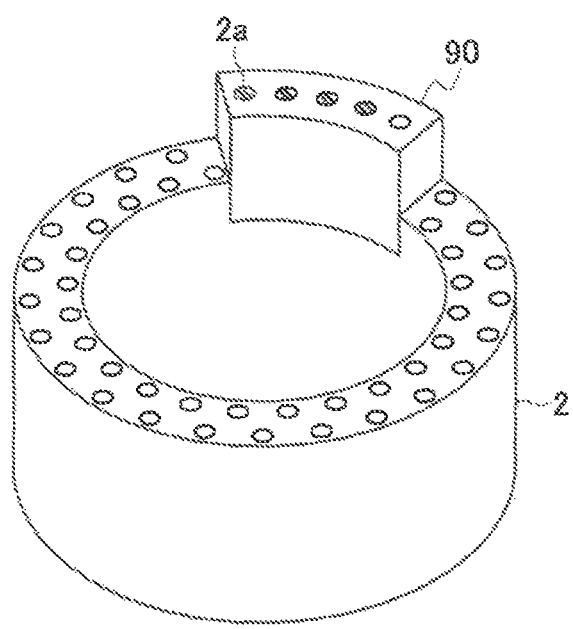
FIG. 13 is an explanatory diagram illustrating a sample turntable and a rack according to a fourth embodiment of the present invention.

FIG. 13 is an explanatory diagram of a sample turntable and a rack according to the fourth embodiment.

As with the position specifying screen 80 illustrated in FIG. 11, the biochemical analyzer 1 specifies a rack 90 on which calibrators/controls are to be arranged, and also specifies the arrangement positions of the calibrators/controls on the rack 90.

The control unit 31 reads a barcode on a side surface of the rack 90 before arrangement to find the type of the rack 90 and understand the shape of the rack 90 and the number of positions on the rack 90. The operator may attach the rack 90 to a specified position and arrange a missing calibrator/control in a way similar to that described above in accordance with an instruction from the biochemical analyzer 1.

Then, after the completion of calibration measurement and control measurement, the control unit 31 displays a message prompting the removal of the rack 90 attached to the sample turntable 2.

The fourth embodiment described above can achieve operations and effects similar to those of the second embodiment (FIG. 11) by using the rack 90 configured to be removably attachable to the sample turntable 2.

The operator may be able to select which of the third and fourth embodiments described above to implement on a selection screen (not illustrated). This can increase the number of solutions selectable by the operator when the sample turntable 2 has no position available for a calibrator/control necessary for the measurement of a selected item.

5. Others

In the third embodiment, a description has been given of an example in which when a single sample turntable 2 necessary for measurement is insufficient to mount calibrators/controls, another sample turntable is used in addition to the sample turntable 2. However, the third embodiment is not limited to this example. For example, the sample turntable 2 may be replaced by a new sample turntable and an insufficient number of calibrators/controls may also be arranged on the new sample turntable.

In the first to fourth embodiments described above, a description has been given focusing on calibration measurement and control measurement. However, the first to fourth embodiments may be applied to the measurement of general samples.

The present invention is not limited to the exemplary embodiments described above, and it is to be understood that a variety of other applications and modifications may be taken without departing from the gist of the present invention as defined in the appended claims.

For example, the exemplary embodiments described above are intended to describe the configuration of an apparatus and a system in a detailed and specific manner to help understand the present invention, and are not limited to embodiments including all of the configurations described above. Part of a configuration in a certain exemplary embodiment may be replaced with a configuration in another exemplary embodiment. In addition, a configuration in a certain exemplary embodiment may be combined with a configuration in another exemplary embodiment. Additionally, other configurations may be added to, deleted from, or replaced with part of a configuration in each exemplary embodiment.

Furthermore, some or all of the configurations, functions, processing units, processing means, and so on described above may be implemented by hardware by integrated circuit design, for example. Alternatively, the configurations, functions, and so on described above may be implemented by software by a processor interpreting and executing respective programs that implement the functions. Information such as programs for implementing the functions, tables, and files may reside on a recording device such as a memory, a hard disk, or a solid state drive (SSD) or on a recording medium such as an IC card, a secure digital (SD) card, or a digital versatile disc (DVD).

Control lines and information lines considered to be necessary for description are illustrated, and not all of the control lines and information lines necessary for each product are illustrated. In actuality, substantially all of configuration elements may be considered to be interconnected.

In addition, processing steps describing time-series processes herein include not only processes performed in a time-series manner in the order described herein but also processes that are not performed in a time-series manner but are executed in parallel or individually (for example, parallel processes or object-based processes).

What is claimed is:

1. An automatic analyzer configured to analyze samples, the automatic analyzer comprising:
   a sample-container array unit having positions at which one or more containers each containing a sample are arranged, wherein said one or more containers each have a barcode on a side surface;
   a barcode reader configured to read information from each barcode of the one or more containers;
   a measurement unit that measures amounts of components contained in samples of the sample-container array unit;
   a display unit configured to display an item selection screen depicting a plurality of items, the plurality of items representing a type of measurement item and a type of sample;
   an input unit configured to produce an input of selected items of the plurality of items on the item selection screen based on operator input of an operator, the selected items representing the type of measurement item and the type of sample, wherein the type of sample comprises a calibrator or control, and wherein the input of selected items based on the operator input excludes position information of the sample-container array unit;
   an availability information table that holds availability information and at least part of the information read by the barcode reader, the availability information being information indicating whether each of the positions in the sample-container array unit is available; and
   a control unit configured to:
     update the availability information table based on information read by the barcode reader from one or more barcodes on said one or more containers;
     determine whether or not a sample that is required for performing measurement corresponding to the item representing the type of measurement item and the item representing the type of sample, input by the input unit, is stored in the sample-container array unit by referencing the availability information of the availability information table for each position in the sample-container array unit; and
     in response to determining that the sample that is required for performing measurement is not arranged in the sample-container array unit by determining that the sample that is required for performing measurement is not specified in the availability information table:
   refer to the selected items and the availability information held in the availability information table,
   specify a position among the positions in the sample-container array unit that are available at which a container of the one or more containers containing the sample that is required for performing measurement is to be arranged in accordance with a specified arrangement rule, wherein the position is specified from among the positions in the sample-container array unit that are available based on the availability information, and
   cause the display unit to display information on the specified position in the sample-container array unit, wherein the specified arrangement rule specifies that the containers are arranged in order of increasing item numbers and in order of increasing concentrations.

2. The automatic analyzer according to claim 1, further comprising a sample setting information holding unit that holds setting information on a plurality of samples,
   wherein the arrangement rule is a rule in which the one or more containers containing a sample corresponding to the selected items are arranged in an order in which data identifying samples of the one or more containers containing a sample are set in the sample setting information holding unit.

3. The automatic analyzer according to claim 1, wherein the control unit causes the display unit to display the information on the specified position in the sample-container array unit by using text and a drawing.

4. The automatic analyzer according to claim 1, wherein the sample-container array unit is a turntable, and
   wherein the control unit causes the display unit to display a button on a screen depicting a drawing including information on a specified position on the turntable, the button being configured to cause the control unit to execute, when the button is clicked, operation of the turntable so that the specified position is moved to a front side of the turntable as viewed from a side of the operator, and the control unit performs control to move the turntable so that the specified position is located on the front side of the turntable.

5. A non-transitory computer-readable recording medium storing a program for causing a computer to execute a procedure, the procedure comprising:
   in response to a barcode reader reading information from one or more barcodes on one or more containers each containing a sample, updating an availability information table that holds availability information and holds at least part of the information read by the barcode reader, the availability information being information indicating whether each position of a plurality of positions in a sample-container array unit is available;

displaying, on a display unit, an item selection screen depicting a plurality of items, the plurality of items representing a type of measurement item and a type of sample;

receiving an input of selected items of the plurality of items on the item selection screen based on operator input of an operator, the selected items representing the type of measurement item and the type of sample, wherein the type of sample comprises a calibrator or control, and wherein the input of selected items based on the operator input excludes position information of the sample-container array unit;

determining whether or not a sample that is required for performing measurement corresponding to the item representing the type of measurement item and the item representing the type of sample, received as the input, is stored in the sample-container array unit by referencing the availability information of the availability information table for each position in the sample-container array unit; and in response to determining that the sample that is required for performing measurement is not arranged in the sample-container array unit by determining that the sample that is required for performing measurement is not specified in the availability information table:
   referring to the selected items and the availability information,
   specifying a position among the positions in the sample-container array unit that are available at which a container containing the sample that is required for performing measurement is to be arranged in accordance with a specified arrangement rule, wherein the position is specified from among the positions in the sample-container array unit that are available based on the availability information, and wherein the specified arrangement rule specifies that containers containing samples in the sample-container array unit are arranged in order of increasing item numbers and in order of increasing concentrations; and
   displaying, on the display unit, information on the specified position in the sample-container array unit.

* * * * *